Figure 1:
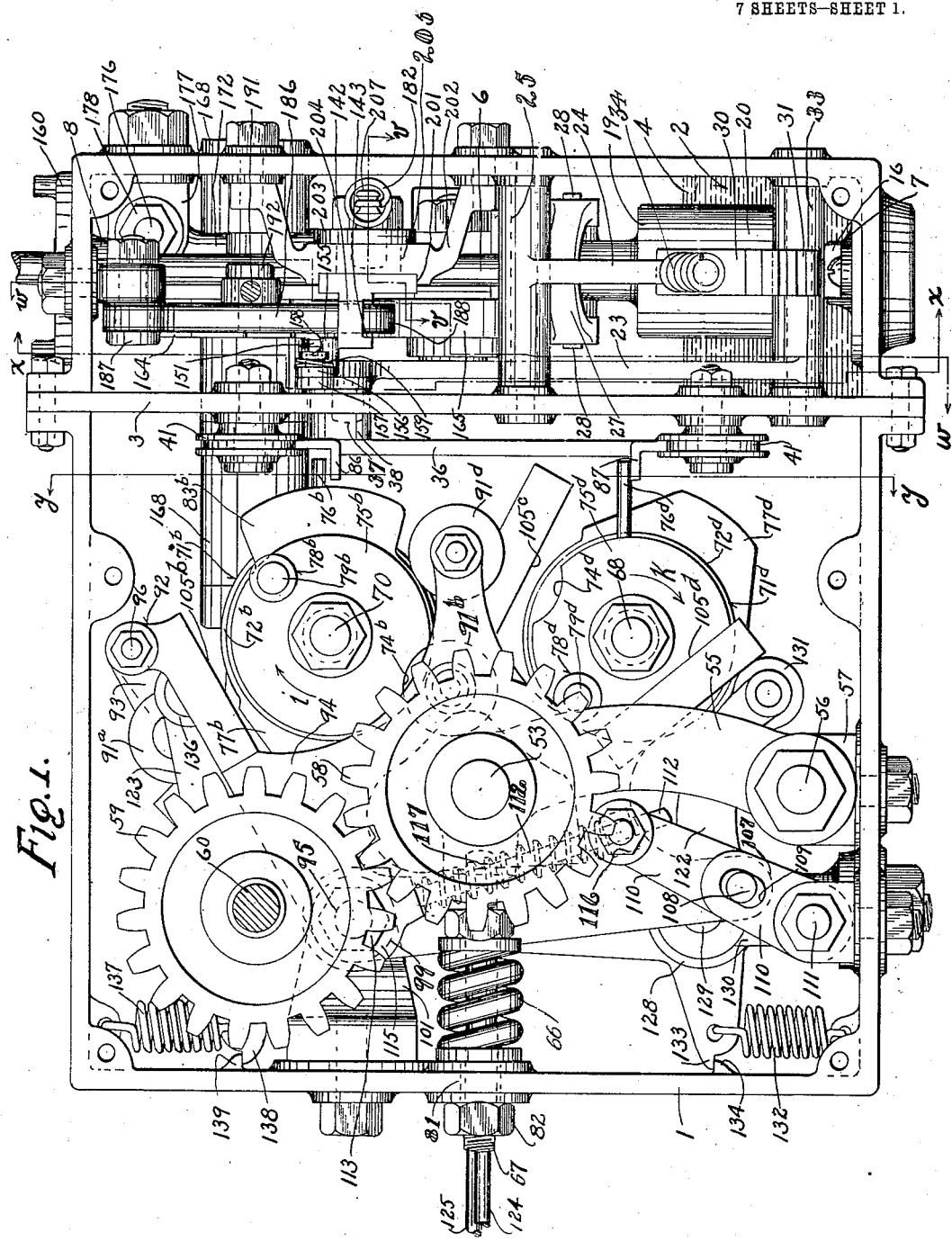

A. E. REUSS & O. SCHNITZLER.
CONTROLLING MECHANISM.
APPLICATION FILED OCT. 14, 1911.

1,058,264.

Patented Apr. 8, 1913.

7 SHEETS—SHEET 1.

Witnesses:
Jacob A. Hollander
Theresa Silber

Inventors:
Arthur E. Reuss,
Oscar Schnitzler,
by their Attorney.

A. E. REUSS & O. SCHNITZLER.
CONTROLLING MECHANISM.
APPLICATION FILED OCT. 14, 1911.

1,058,264.

Patented Apr. 8, 1913.

7 SHEETS—SHEET 6.

A. E. REUSS & O. SCHNITZLER.
CONTROLLING MECHANISM.
APPLICATION FILED OCT. 14, 1911.

1,058,264.

Patented Apr. 8, 1913.

7 SHEETS—SHEET 7.

Witnesses:
Jacob A. Hollander
Theresa Silber

Inventors:
Arthur E. Reuss
Oscar Schnitzler,
by their Attorney

UNITED STATES PATENT OFFICE.

ARTHUR E. REUSS, OF CINCINNATI, AND OSCAR SCHNITZLER, OF REMINGTON, OHIO.

CONTROLLING MECHANISM.

1,058,264. Specification of Letters Patent. Patented Apr. 8, 1913.

Application filed October 14, 1911. Serial No. 654,610.

*To all whom it may concern:*

Be it known that we, ARTHUR E. REUSS and OSCAR SCHNITZLER, citizens of the United States, residing, respectively, in Cincinnati and at Remington, in the county of Hamilton and State of Ohio, have jointly invented certain new and useful Improvements in Controlling Mechanism, of which the following is a specification.

Our invention relates to controlling mechanism applicable for instance in controlling the propulsion of a motor-driven vehicle, or for controlling the changes in a speed changing mechanism, and may be employed for instance in initiating the changes in speed changing mechanisms such as illustrated, described and claimed in our copending applications Serial No. 635,127, filed June 24, 1911, and Serial No. 654,869, filed October 16, 1911, the latter application being executed of even date herewith. That portion of the mechanism herein shown and described relating to the conveyer-screw and its attendant parts is shown, described and claimed in our copending application Serial No. 630,094, filed May 29, 1911.

The objects of our invention are to provide novel means for positioning or controlling coöperating parts concerned in initiation of change in the controlled device; which latter may be instanced as the speed changing mechanism of one of our first aforesaid copending applications; further to provide novel means whereby a controlled device may be affected, for instance at a given speed limit; further to provide novel means for actuating a controlling element or elements; further to provide novel means whereby a controlled element may be subjected to operations in relation to speeds desired; further to provide novel means whereby these operations may be effected in increasing or decreasing speeds; further to provide novel means whereby a limit of speed may be provided at selective points throughout the series of speeds; further to provide novel cam mechanism and coöperating parts; further to provide novel means for initiating operation of the cam mechanism; further to provide novel means for determining the relative actuations of the cam mechanisms; further to provide novel actuated mechanism arranged for connection with a controlled member or members; and further objects will also be disclosed in the specification following.

Figure 2:
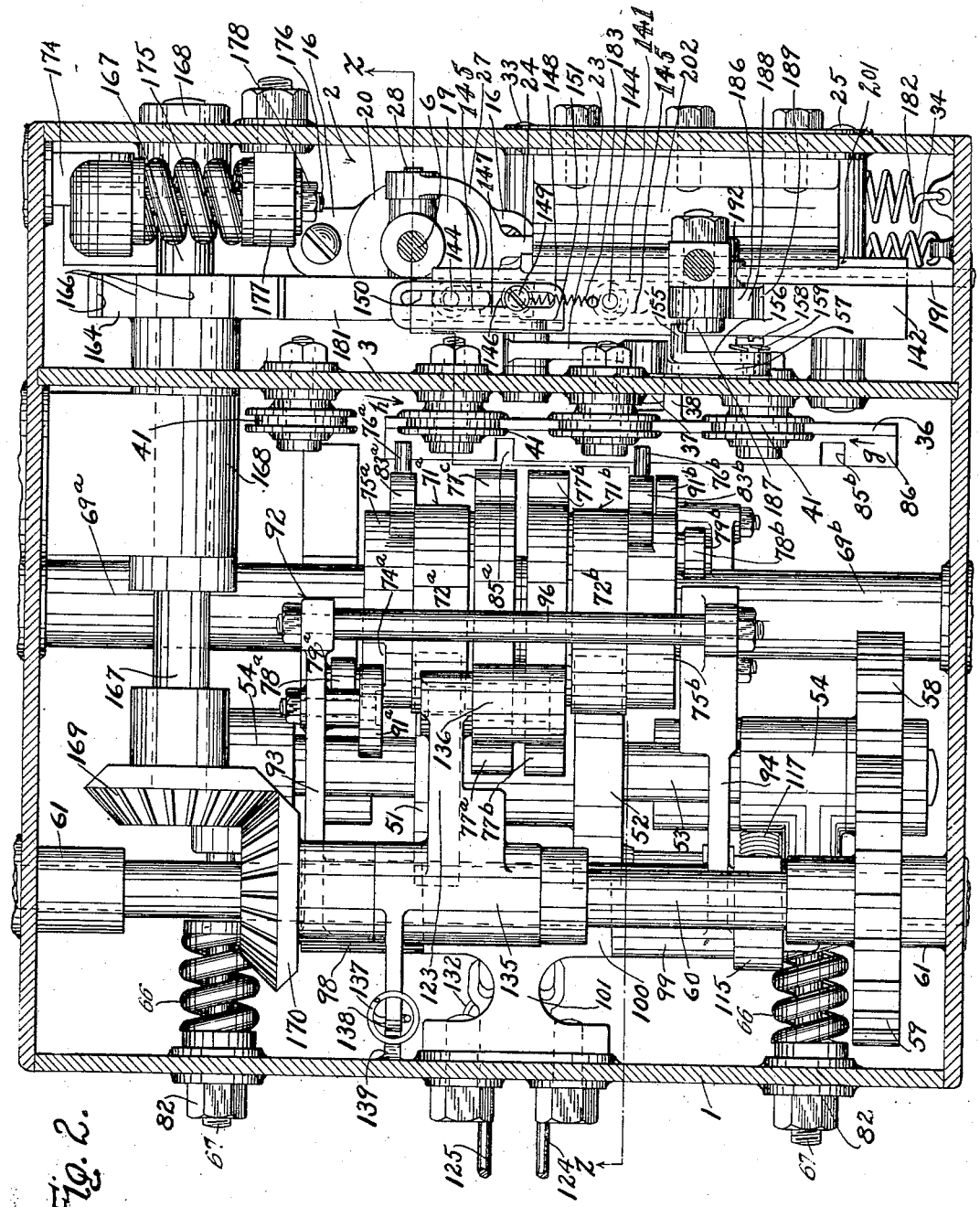
Figure 3:
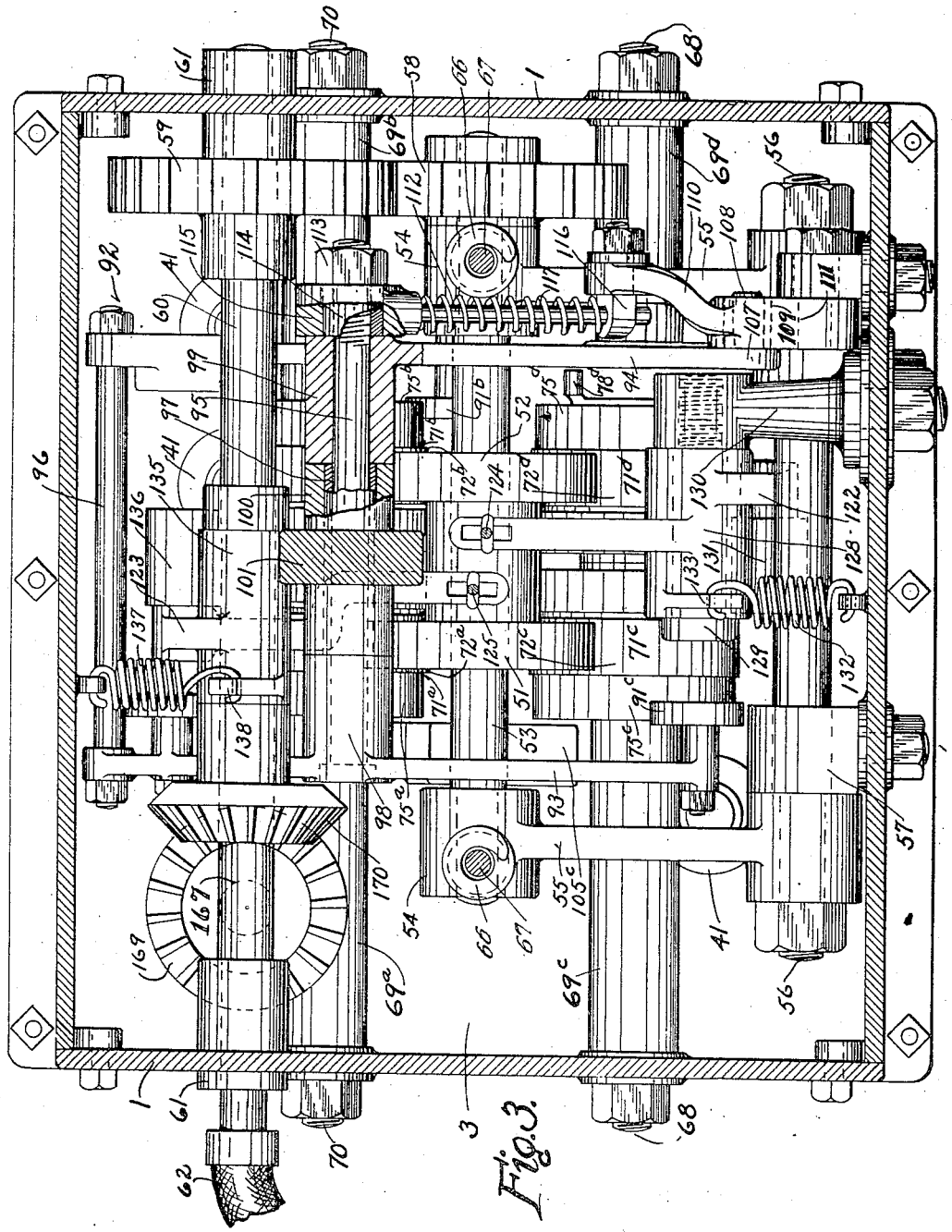
Figure 4:
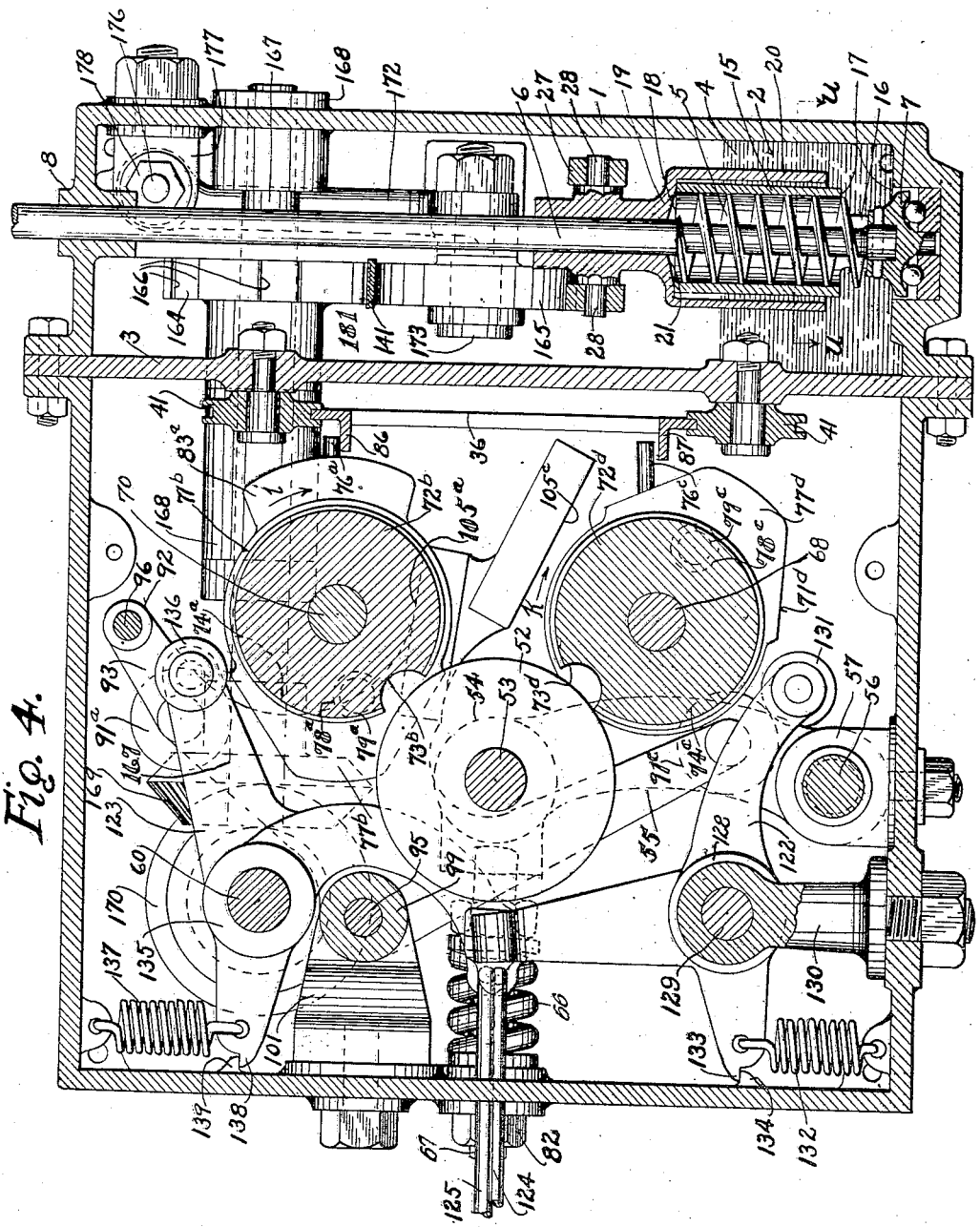
Figure 5:
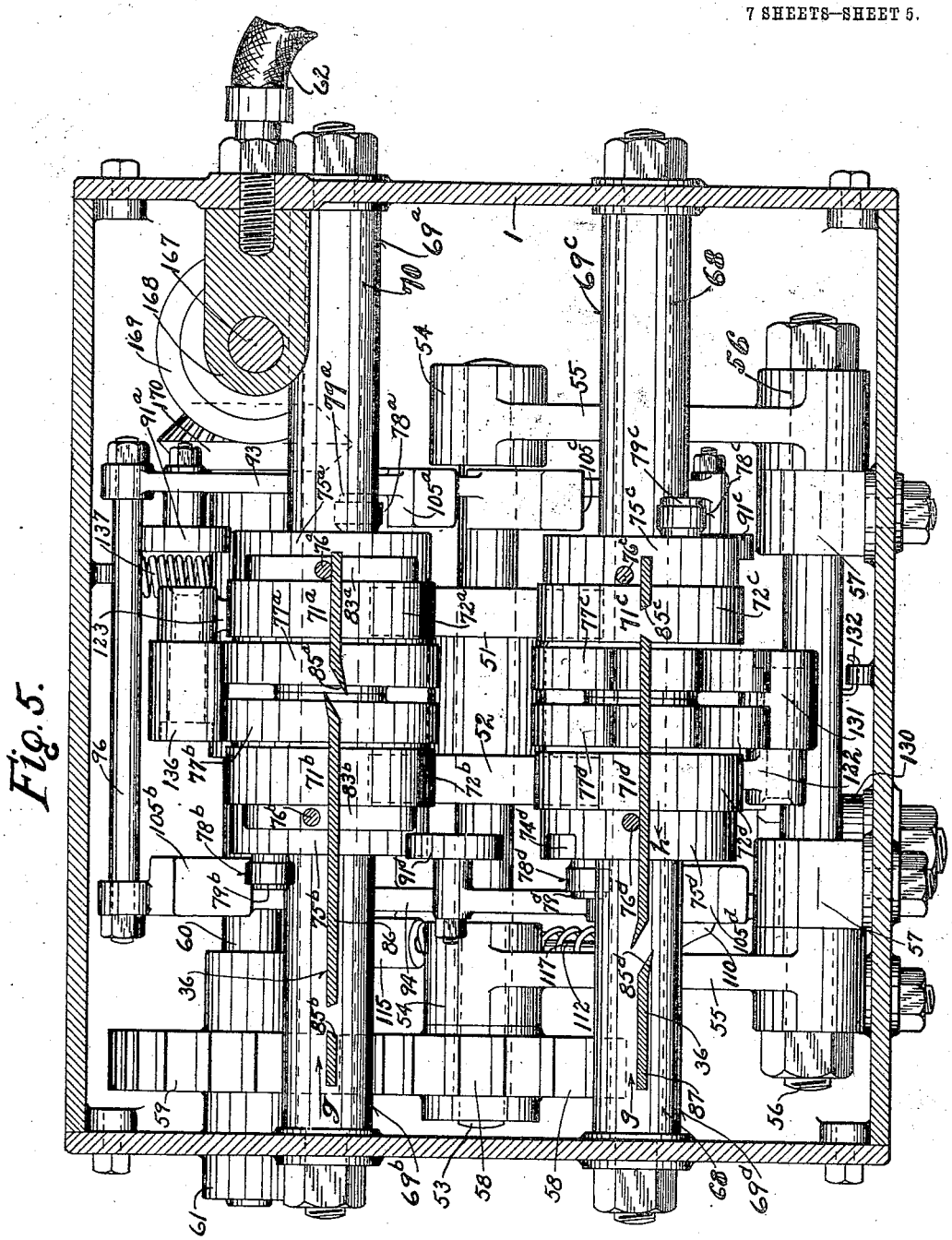
Figure 6:
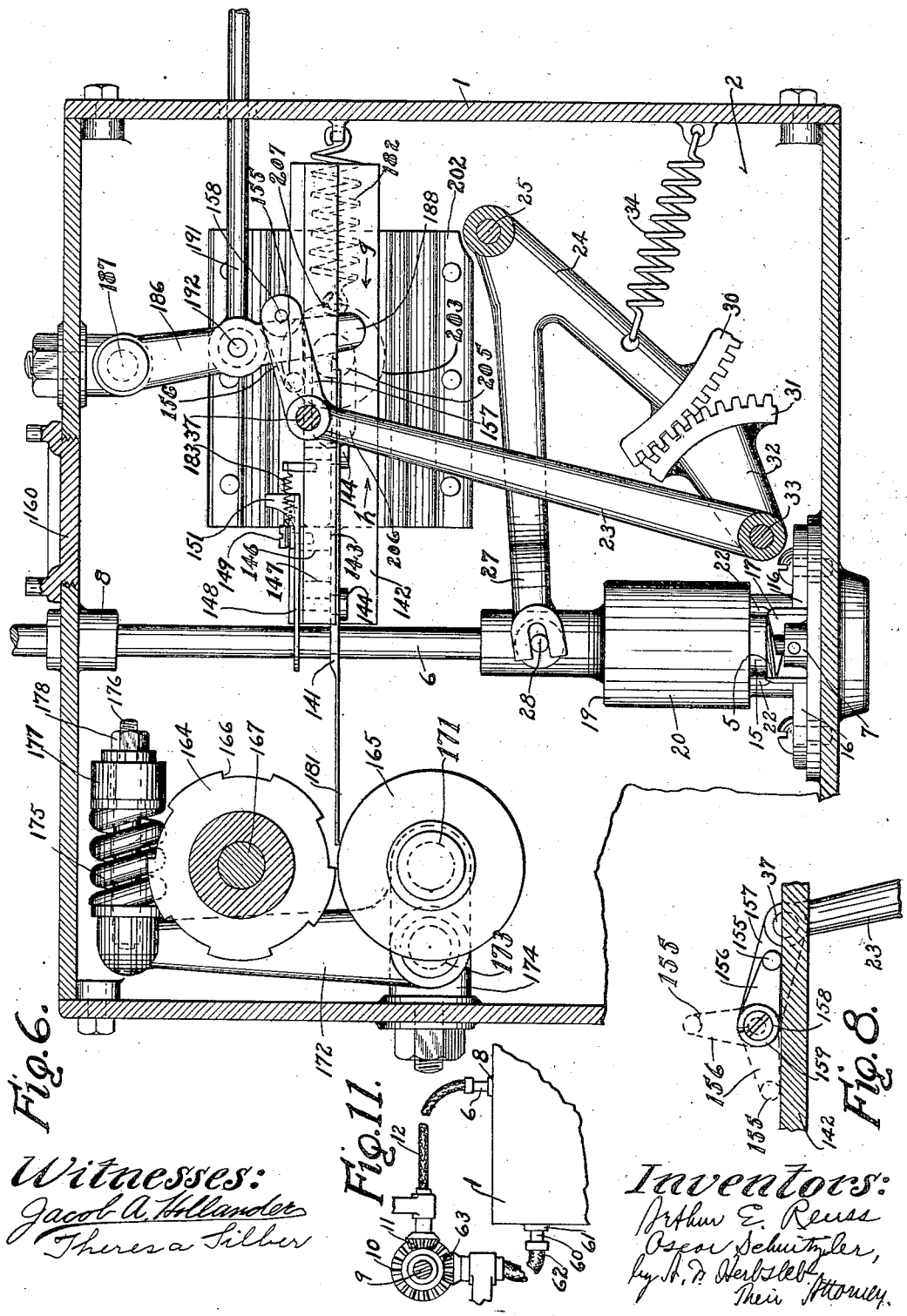
Figure 7:
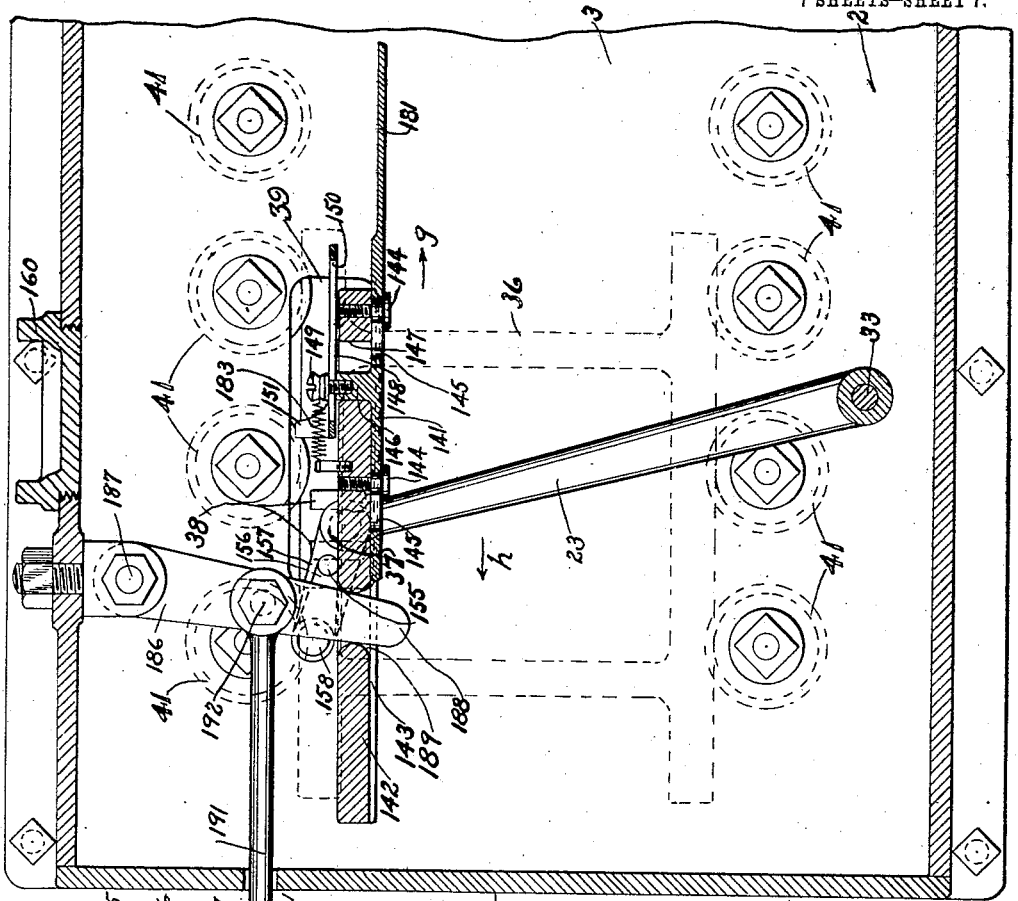
Figure 9:
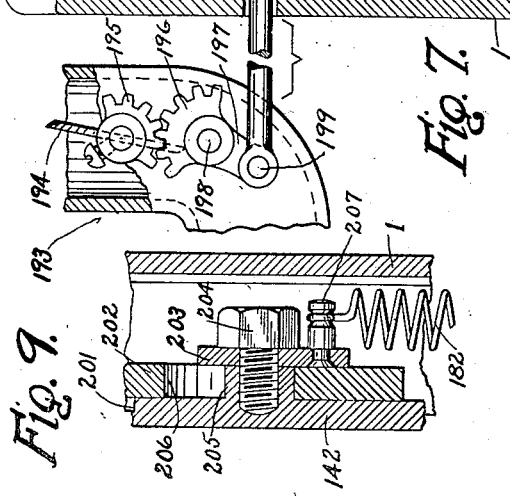
Figure 10:
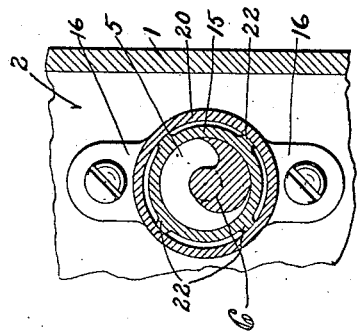

The invention will be readily understood from the foregoing, and from the following description and claims, and from the drawings in which latter:

Figure 1 is a side elevation of our improved device with the side of the casing removed. Fig. 2 is a plan view of the same, with the top of the casing removed for better illustration of parts. Fig. 3 is a rear elevation of the same, with the rear wall of the casing removed. Fig. 4 is a sectional elevation of our improved device taken on the irregular section $z$—$z$ of Fig. 2. Fig. 5 is a vertical section of our improved device taken on the line $y$—$y$ of Fig. 1. Fig. 6 is a vertical section of our improved device taken on the irregular line $x$—$x$ of Fig. 1. Fig. 7 is a vertical section of our improved device taken on the irregular line $w$—$w$ of Fig. 1, showing the positioning arm and parts operated thereby. Fig. 8 is a detail of the positioning arm showing the contact-arm thereon in a given position in full lines and in assumed positions in dotted lines. Fig. 9 is a detail of the secondary slide for the speed-limit control, showing its manner of mounting and taken on the irregular line $v$—$v$ of Fig. 1. Fig. 10 is a horizontal section of the conveyer-screw and attendant parts taken on the line $u$—$u$ of Fig. 4, and Fig. 11 is a detail showing the means for driving the operating mechanism and controlling means from the controlled element.

1 represents the casing which may be of suitable form.

We provide governing parts for the mechanism, which may embrace a reservoir 2, one wall of which is formed by a partition 3, the reservoir being arranged to receive a suitable fluid, shown at 4, in which a screw 5, shown as a conveyer-screw, is arranged to rotate. This conveyer-screw is shown on a shaft 6 journaled in a step-bearing 7 and a bearing 8 on the casing. We prefer to drive this shaft from the driven element, the speed of which is controlled by the mechanism, which may be the driven axle 9 of an automobile, with which a suitable driving connection for the shaft 6 may be had, as by gears 10, 11, and a flexible shaft 12.

15 is a tube which surrounds the conveyer-screw, the tube having support on the casing, as by legs 16, and provided with an inlet-end 17 and an outlet-end 18 for the passage of the fluid through the tube when propelled by the conveyer-screw. This fluid in practice is preferably a heavy oil, such as glycerin, or other fluid suitable for the purpose.

19 is an end-member against which the fluid-conveyer discharges for moving the same, the extent of movement thereof being controlled by the speed of said discharge. We have shown this end-member as comprising an inverted cup 20 having an end 21 against which the discharge takes place. The wall of the cup is received about the tube and is preferably guided in its axial movement by guide-ribs 22 on the tube.

23 is a positioning arm actuated by the end-member, preferably through the medium of an arm 24 pivoted on a rod 25 in the casing, the arm 24 being shown as a bell-crank arm, one of the branches of which is provided with a fork 27, the tines of which have articulation with pins 28 on the hub of the end-member, this end-member having axial movement on the shaft 6. The other branch of the arm 24 is provided with a segment-gear 30 which meshes with a segment-gear 31 on an arm 32 rigid with the arm 23, the arms 23, 32, being pivoted about a rod 33 in the casing, the parts being retracted by a spring 34.

36 is a slide which is positioned by the arm 23, with which it has connection as by means of a pin 37 on the arm being received between lugs 38 on the slide, these lugs forming a slot in which said pin is received, the pin and slot having connection through an opening 39 in the partition 3. The slide is positioned between rollers 41 for affording ease of movement of the slide, the position of the slide determining the moment of actuation of the initiating mechanism of our improved device, which in the form shown, also embraces pins and slots hereinafter described.

For operating the actuated parts hereinafter described we provide friction-wheels 51, 52, secured to a shaft 53 journaled in bearings 54 of rocker-arms 55 pivoted on a shaft 56 in bearings 57 of the casing. The friction-wheels 51, 52, are preferably continuously rotated during operation of the device, for which purpose the shaft 53 has a gear 58 thereon and is meshed by a gear 59 on a shaft 60 journaled in bearings 61 in the casing. The shaft 60 is arranged to be rotated in suitable manner, preferably by the controlled device, as by the rear axle 9 of the automobile which is propelled, and the speed of which is arranged to be regulated by our improved device, which connection may be effected in suitable manner, as through a flexible connection 62 which may be driven by the driven axle through bevel-gears 63, 10.

$71^a$, $71^b$, $71^c$, $71^d$, are a series of sets of cams, the cams of each set rotating together. The cam-sets $71^a$ and $71^b$ are loosely journaled about a rod 70 secured in the casing and are held in endwise relation by sleeves $69^a$ and $69^b$, and the cam-sets $71^c$ and $71^d$ are loosely journaled about a rod 68 secured in the casing and are held in endwise relation by sleeves $69^c$ and $69^d$. Each of these sets comprises the following parts designated by the numerals applied thereto with the exponents "a, b, c, d," corresponding to the set of cams to which the said exponents respectively belong, namely: Each set of cams comprises an intermittently rotatable friction-wheel 72 provided with a clearance recess 73, a locating recess 74 being provided in a hub 75 from which a pin 76 projects, there being further a cam 77, and a cam 78, the latter being shown as an eccentrically-placed roller on a pin 79 on the hub. The friction-wheel 72, cams 77, 78, and the pins and locating recesses, are located in different planes extending transverse to the rotary axis of the cam-set. The clearance recesses $73^a$, $73^c$, and $73^b$, $73^d$, are normally positioned opposite the respective friction-wheels 51, 52, the latter being urged toward the former by springs 66 between the casing and the rocker-arms 55. Limiting rods 67 are threaded into the rocker-arms and passed through holes 81 in the casing, the outer ends of the limiting rods being threaded for receiving nuts 82 which adjustably limit the inward movement of said arms and distance the continuously rotating friction-wheels from the walls of the clearance recesses in the intermittently rotating friction-wheels. The cam-sets are normally so weighted that the pins thereon will normally drop. The cams $77^c$, and $77^d$, are at the pin sides of the cam-sets $71^c$, $71^d$, while the cam-sets $77^a$, $77^b$, are at substantially the opposite sides of said cam-sets, these latter cams however being counter-weighted by the counter-weight lugs $83^a$ and $83^b$. The pins $76^a$, $76^b$, $76^c$, $76^d$, respectively coact with slots $85^a$, $85^b$, $85^c$, $85^d$, respectively in flanges 86, 87 of the slide 36, the pins being adapted to selectively drop through said slots by gravity when the several pins and slots register with each other for the purpose and in manner hereinafter stated.

The conveyer-screw and its attendant parts act as a governing mechanism, the connection of which with the slide and the driven element control the direction of movement and the position of the slide, this position being dependent on the speed of the driven element, and the direction of movement of the slide being dependent on whether the driven element is operating at an increasing or a decreasing speed. The direction of movement of the slide during an increasing speed is indicated by the arrow $g$ and its direction of movement during decreasing speed is indicated by the arrow $h$.

It will be assumed that the controlled element is a speed-changing mechanism similar to that shown in either of our aforesaid applications, Serial Nos. 635,127 and 654,869, in which three speeds are provided for, namely, low speed, an intermediate speed and a high speed, the steps of increasing speed being from low to intermediate and from intermediate to high, and the steps of decreasing speed being from high to intermediate and from intermediate to low. When the slide moves for changes of speed by steps from low to high, the slide moves in the direction of the arrow $g$, and when changes of speed are effected by steps from high to low, the said slide moves in the direction of the arrow $h$.

The cam-sets $71^a$ and $71^b$, arranged end to end, and the slots $85^a$ and $85^b$, in the slide, are instrumental in effecting initiation of increasing speed relation in the controlled device, and the cam-sets $71^c$ and $71^d$, also arranged end to end, and the slots $85^c$ and $85^d$ in said slide, are instrumental in effecting initiation of decreasing speed relation, the cam-sets $71^a$ and $71^c$, and the cam-sets $71^b$ and $71^d$, being placed opposite each other, whereby compact arrangement of parts is obtained. The cam-sets $71^a$ and $71^b$ rotate intermittently in the direction of the arrow $i$ and the cam-sets $71^c$ and $71^d$ rotate intermittently in the direction of the arrow $k$. The cam-set $71^a$ is instrumental in effecting change from low to intermediate speed, and the mechanism is shown in relation for effecting such a step as the first step in the operation of the device, the elements being shown in low speed relation, being their normal relation or positions of rest. In effecting such change from low to intermediate speed, the pin $76^a$ drops through the slot $85^a$, the walls of which are shown slanting in the direction of the arrow $g$ and approaching each other's transverse planes for permitting the pin $76^a$ to pass through said slot only when the said slide moves in the direction of the arrow $g$. The cam $71^b$ is effective in initiating a change in speed from intermediate to high, for effecting which the pin $76^b$ drops through the slot $85^b$. In returning from high to low speeds by steps as aforesaid, the cam-set $71^d$ is effective for a speed change from high to intermediate, to accomplish which the pin $76^d$ is arranged to drop through the recess $85^d$, the walls of which latter slant in the direction of the arrow $h$, and project toward each other's cross-sectional planes, for permitting the pin $76^d$ to pass through said slot only when the slide moves in the direction of the arrow $h$.

The cam-set $71^c$ is effective for changing from intermediate to low speed, in which case the pin $76^c$ drops through the slot $85^c$. The pins and slots are so arranged that only a pin in the next increasing or decreasing step of speed may drop through a slot. Thus when the operation of the device is begun, the pin $76^a$ will be resting on the flange 86 and the speed increasing, caused for instance by the opening of the throttle of the engine, the slide will be moved in the direction of the arrow $g$ by the governing mechanism, and when the slot $85^a$ reaches the pin $76^a$, the pin will drop through the slot, thereby permitting a partial rotation of the cam-set $71^a$ and moving the clearance recess $73^a$ of the friction-wheel $72^a$ with relation to the friction-wheel 51 and permitting engagement between the frictional periphery of the friction-wheel $72^a$ with the frictional periphery of the friction-wheel 51, for imparting a rotation to the cam-set $71^a$, the pin $76^a$ however, being arrested in a position above the flange 86, and the pin $76^b$, which has meanwhile been held in elevated position with relation to said flange, being released for making contact with said flange, ready to drop through the slot $85^b$ when said slot reaches the cross-sectional plane of said pin. The pin $76^c$ is also released when the pin $76^a$ passes through said slot, so that either pin $76^b$ may pass through slot $85^b$, if an increase of speed from intermediate to high is obtained, or the pin $76^c$ may pass through the slot $85^c$ if a decrease of speed from intermediate to low is obtained, dependent on resistance to propulsion of the operated device, or supply of motive power through the usual throttle of the explosive engine.

By means of our improved device change in speed relation, in the speed changing mechanism may be controlled by the usual throttle of the explosive motor, for if the supply of fuel is reduced, a decrease in speed relation will follow, or if the supply of fuel is increased, an increase in speed relation, within the capacity of the motive power with relation to resistance encountered, will follow. If a high speed has been obtained, and a decrease from high to intermediate is effected, the slide, which has in the meantime moved throughout its range in the direction of the arrow $g$, returns in the direction of the arrow $h$, and the pin $76^d$ drops through the slot $85^d$. Any pin which has last dropped through a slot is arrested in elevated position with relation to its flange, and the pin upon the opposite cam-set is released, which, with the form of the slots mentioned, secures sequential operation of parts and prevents interference of operation by one of the parts with the other. For positioning the pins and permitting operation of the cam-sets, we provide parts which coact with the locating recesses 74$^a$, 74$^b$, 74$^c$, 74$^d$, shown in the form of rollers 91$^a$, 91$^b$, 91$^c$, 91$^d$. These rollers are arranged to be received in the locating recesses of those cam-sets the pins of which are momentarily to be held in raised positions, while the rollers for those cam-sets, the pins of which are arranged to be dropped into operative relation, are momentarily held in disengaged relations, permitting that one of the latter pins which registers with a slot in the slide, which will permit it, to drop through. For accomplishing this we provide an oscillating framework 92 comprising side frames 93, 94, rigidly secured together by tie-bolts 95, 96, the tie-bolt 95 being surrounded by a sleeve 97 against the ends of which the hubs 98, 99, of the side-frames are clamped. The sleeve 97 has rocking fit in a bearing 100 on a bracket 101 secured to the casing. The framework or oscillating frame also has contact-faces 105$^a$, 105$^b$, 105$^c$, 105$^d$, thereon, respectively arranged to be engaged by the eccentric cams 78$^a$, 78$^b$, 78$^c$, 78$^d$. The oscillating frame is rocked by the said eccentric cams contacting the said contact-faces respectively, for moving the respective positioning rollers out of selective positioning recesses and into other selective positioning recesses. The latter part of the rocking movements of the frame is preferably accomplished by spring pressure means. For this purpose one of the side-frames is provided with a lug 107 upon which a pin 108 is located, the pin being received in a slot 109 of an arm 110 pivoted on a stud 111.

112 is an arm pivoted about the rocking axis of the oscillating frame, for instance by forming the clamp-nut 113 for the tie-bolt 95 with a journal-hub 114 about which the bearing 115 of the arm 112 is pivoted. The arm 112 is received through a swivel-piece 116 on the arm 110, a spring 117 being interposed between said swivel-piece and the bearing of arm 112, the spring urging the arm 112 to either side of a right line between the axes of the arms 110 and 112 at which said swivel-piece may be placed. When therefore, the rocker-arm has been shifted sufficiently for shifting said swivel-piece to either side of said right line, the movement of the rocker-arm is continued by the action of the spring, so that the positioning rollers may yieldingly contact the peripheral faces of their respective cam-sets and ride thereon until the positioning recesses on said cam-sets come opposite the rollers, whereupon the rollers will snap into the recesses for positioning said respective cam-sets.

It will be noted that the positioning rollers 91$^a$ and 91$^c$, on the side-frame 93, have the cam-sets upon which they operate located between them, while the contact-faces 105$^a$, 105$^c$, on said side-frame, acted on by the said cam-sets, are located between said cam-sets, whereby the cam-set which acts upon one of said contact-faces shifts the positioning roller therefor into engagement with said cam-set, releases the opposite positioning roller on said side-frame from the opposite cam-set, and places the opposite contact-face into position for contact by the eccentric roller on said opposite cam-set. On the other hand the positioning rollers on the side-frame 94 are located between the cam-sets upon which they operate and the contact-faces on said side-frame have said cam-sets located between them. By these arrangements opposite cam-sets are alternately acted on. The respective cam-sets also have the actuating cams 77$^a$, 77$^b$, 77$^c$, 77$^d$ thereon, which act on the actuated mechanism or controlling element or elements, shown as a pair of levers 122, 123, which may have suitable connection with an operated device, heretofore mentioned, as through flexible connections 124, 125, which may connect with said operated device and correspond to the flexible connections illustrated in our aforesaid applications, Serial Nos. 635,127 and 654,869.

The lever 122 has a bearing 128 about a stud 129 threaded into a pedestal 130 in the casing. The lever is shown as a bell-crank lever with one of the arms of which the flexible connection 124 connects, its other arm supporting a roller 131 to be contacted by either cam 77$^c$ or 77$^d$. A spring 132 retracts the lever, which also has a lug 133 thereon arranged to contact a lug 134 on the casing, acting as a retracting stop for the lever. The lever 123 has a bearing 135 journaled about the shaft 60. The flexible connection 125 connects with one of its arms and its other arm has thereon a roller 136 arranged to be contacted by either cam 77$^a$ or 77$^b$.

137 is a spring for retracting the lever 123. For limiting the retraction a suitable stop is provided, shown as a lug 138 on the lever and a lug 139 on the casing.

One of the levers is actuated when the slide 36 moves in one direction and the other lever is actuated when said slide moves in the opposite direction. Thus when the slide moves in the direction of the arrow $q$, the cam-sets 71$^a$ and 71$^b$, which are laterally arranged with relation to each other and control a speed change in increasing ratio from low to intermediate and intermediate to high speed, are operated, in turn actuating the lever 123, and when said slide moves in the opposite direction for decreasing speeds as from high to intermediate and from intermediate to low, the cam-sets 71$^c$ and 71$^d$, which are laterally arranged with relation to each other, actuate the lever 122. The levers in turn effect corresponding operations in the controlled device, respectively causing changes in speed respectively in increasing and decreasing ratio.

We further provide means for controlling the speed limit of the device being propelled or driven, and we have exemplified these means as consisting of the following instrumentalities, namely: 141 is a primary slide and 142 is a secondary slide, the primary slide sliding on the secondary slide in a slideway 143, and held thereto by screws 144 threaded into the secondary slide and received through slots 145 in the primary slide. A lug 146 extends from the primary slide through a slot 147 in the secondary slide and has a contact-piece 148 shown adjustable thereon as by a clamp-screw 149 received through a slot 150 in the contact-piece and threaded into the lug 146, the contact-piece being provided with a contact-lip 151. 155 is a striker-part arranged to engage the contact-piece and is shown as a pin actuated by the arm 23, arrangement being made so that the speed-limit device may be rendered inactive, as by moving the pin out of range of the contact-lip, which in the present exemplification is accomplished by mounting the pin on an arm 156 pivoted to an extension 157 of the arm 23 at 158. The arm 156 may be swung into forward position with relation to the slide 36, as shown in full lines in Fig. 8 or it may be swung in rearward position, as shown in dotted lines in said figure, whereby, with the adjustment of the contact-piece 148, a wide range of speed limit may be obtained for our improved device, and the limit set within any one of the range of speeds of the speed-changing mechanism. The striker-part is rendered inactive by placing the arm 156 in vertical position, as shown in dotted lines in said figure. The said arm may be held in any one of its positions by providing a spring washer 159 about the pivot-pin of said arm. Access to the adjusting means for the speed-limit device may be had by a removable plate 160. 164 and 165 are friction-wheels. The friction-wheel 164 is provided with interruptions of its friction surface or recesses 166. The friction-wheel 164 is continuously rotated by being secured to a shaft 167 journaled in a bearing 168 in the casing and having thereon a bevel-wheel 169 which is meshed by a bevel-wheel 170 on the shaft 60. The friction-wheel 165 is mounted on a stud 171 secured to a lever 172 pivoted on a pin 173 in a bearing 174 on the casing. The friction-wheel 165 is held toward the friction-wheel 164 by a spring 175 and is held out of contact with said friction-wheel by a limiting rod 176 secured to said lever and received through a bearing 177 on the casing, the same being adjustable by a nut 178. The spring surrounds the rod and is located between said bearing and lever. When the arm 23 is moved out of its normal or resting position to an extent so that the pin 155 will engage the contact-lip 151, it will initiate movement in the primary slide so as to move a tongue-extension 181, with which said primary slide is provided, into engaging position between the friction-wheel 165 and the raised friction-surfaces of the friction-wheel 164. The friction-wheel with the raised friction surfaces continuously rotating will thereupon make engagement with the tongue by one of its raised friction surfaces, for pinching the tongue between that raised friction surface and the friction surface of the friction-wheel 164, whereby the primary slide is drawn lengthwise between the friction-wheels. The lug 146 will meanwhile have moved in its slot for contacting the end wall of said slot, whereby the secondary slide is drawn with the primary slide by the action of said friction-wheels. As soon however, as one of the interruptions 166 reaches a position opposite the tongue-extension, the latter will be released, and both said slides retracted. A spring 182 between said secondary slide and the casing retracts both said slides, and a light spring 183 between the primary slide and the secondary slide retracts the primary slide to an extent permitted by the position of the pin 155 with relation to the contact-lip 151 or to the full extent permitted by the slot 147. If the position of the pin 155 does not permit retraction of the primary slide to an extent to bring its tongue-extension out of range of the raised friction surfaces, repeated actuations of the slides will take place, until the device operated by said slides has effected a retardation of speed within the speed limit for which the device has been set. If our improved device is applied to an automobile, for instance the speed of travel of the same may be limited to a given number of miles per hour. The device operated by said slides may be any suitable mechanism, and may be for instance a spark-interrupter of an explosive engine or a throttle control for the same. We have illustrated the same as a throttle control, whereby the supply of fuel to the engine is controlled and decreased or cut off by the actuation of the slides, depending on the extent of movement of the throttle. Thus 186 is a lever pivoted at 187 to the casing. It has an end 188 received in a slot 189 in the secondary slide, the walls of the slot causing swinging of the lever with the movement of the secondary slide. 191 is a connection shown as a rod pivoted to the lever at 192 and may lead to a throttle 193, the valve 194 of which is provided with a segment-gear 195 meshed by a segment-gear 196 on a lever 197 pivoted at 198, the rod 191 connecting with said lever at 199. This throttle is preferably an auxiliary throttle. The secondary slide is slidable in a guide-way 201 on a bracket 202 of the casing. It is held in place by a washer 203 through which a bolt 204 threaded into a lug 205 on the secondary slide is received, the lug being in a slot 206 in the bracket 202, the spring 182 being secured to a pin 207 on the washer.

Having thus fully described our invention what we claim as new and desire to secure by Letters Patent, is:

1. In mechanism of the character described, the combination of a governor, a continuously rotating operating part, an intermittently rotating operating part, an actuated part operated by the latter, and motion initiating means for said intermittently rotating part operatively located between said intermittently rotating part and said governor.

2. In mechanism of the character described, the combination of a governor, an actuated part, operating parts normally in inactive relation, and means between the latter and said governor acting on said operating parts for placing the same in active relation, the said operating parts having operative connection with said actuated part for actuating the same.

3. In mechanism of the character described, the combination of a governor, operating parts normally in inactive relation, means between the latter and said governor acting on said operating parts for placing the same in active relation, and an actuated part, said operating parts comprising cam mechanism for moving said actuated part.

4. In mechanism of the character described, the combination of a controlled device, a speed governor having operative connection therewith for having its speed controlled thereby, an actuated device operative for controlling the speed of said controlled device, operating parts for the latter normally in inactive relation, and initiating means between the latter and said governor for initiating active relation between said operating parts.

5. In mechanism of the character described, the combination of a series of cam-sets, continuously rotating driving mechanism, each of said cam-sets embracing a mating driving part for said driving mechanism normally in inactive relation therewith, a governor, and a part controlled thereby, said last-named part and cam-sets provided with coacting elements arranged to control active relation between a given cam-set and said rotating driving mechanism.

6. In mechanism of the character described, the combination of continuously rotating mechanism, a series of cam-sets normally in inactive relation therewith, a governor, a part actuated thereby, said last-named part and cam-sets having coacting parts therebetween for controlling active relation between a given cam-set and said continuously rotating mechanism, and positioning means controlling active relation between selective ones of said coacting parts.

7. In mechanism of the character described, the combination of a continuously rotating operating part, a series of cam-sets located in end-to-end and opposing relations and normally in inactive relation with said continuously rotating operating part, positioning parts operative between opposed cam-sets for positioning the same, a governor, and a part actuated thereby, said last-named part and said cam-sets having coacting parts therebetween for controlling selective operative relation between said cam-sets and continuously rotating operating part.

8. In mechanism of the character described, the combination of a rotatable part, a series of cam-sets located in end-to-end and opposed relations, and a rocker-frame having engaging parts thereon for said cam-sets for positioning the latter and having contacted parts thereon selectively engaged by said cam-sets for moving the same.

9. In mechanism of the character described, the combination of a rotatable part, a series of cam-sets located in end-to-end and opposed relations, a rocker-frame having engaging parts thereon for said cam-sets for positioning the latter and having contacted parts thereon selectively engaged by said cam-sets for moving the same, and an actuated part, said cam-sets being provided with cams for actuating said actuated part.

10. In mechanism of the character described, the combination of a rotatable part, a series of cam-sets located in end-to-end and opposed relations, a rocker-frame having engaging parts thereon for said cam-sets for positioning the latter and having contacted parts thereon selectively engaged by said cam-sets for moving the same, and yielding pressure means acting on said rocker-frame for urging the same into active relation with said cam-sets.

11. In mechanism of the character described, the combination of an operating part, a cam-set, a rocker-part having operative relation with said cam-set for selectively positioning the same in active or inactive relation with said operating part, and an actuated part, said cam-set provided with a cam for operating said rocker-part and with a cam for operating said actuated part.

12. In mechanism of the character described, the combination of a continuously rotating operating part, a cam-set provided with an engaging face for the latter for being rotated thereby, said engaging face having an interruption therein normally opposite said rotating operating part, a rocker-part having a positioning part thereon coacting with said cam-set for positioning said interruption opposite said rotating operating part, said rocker-part having a contacted face, and said cam-set having a cam coacting therewith for rocking said rocker-part, and an actuated device, said cam-set provided with a cam for operating said actuated device.

13. In mechanism of the character described, the combination of a continuously rotating operating part, a cam-set provided with an engaging face for the latter for being rotated thereby, said engaging face having an interruption therein normally opposite said rotating operating part, a rocker-part having a positioning part thereon coacting with said cam-set for positioning said interruption opposite said rotating operating part, said rocker-part having a contacted face, and said cam-set having a cam coacting therewith for rocking said rocker-part, an actuated device, said cam-set provided with a cam for operating said actuated device, a governor, and a part actuated thereby, said last-named part and said cam-set having coacting parts for normally maintaining said interruption opposite said rotating part and permitting release of said cam for permitting actuated relation between said cam-set and rotating operating part.

14. In mechanism of the character described, the combination of a plurality of cam-sets, a rotating part, each of said cam-sets provided with interrupted driven means for said rotating part, a rocker-frame having a positioning part and an operated part thereon for each of said cam-sets, said positioning parts and said operated parts arranged for alternate coaction with said respective cam-sets, and each of said cam-sets being provided with a coacting positioning part and with a cam for moving said operated part of said rocker-frame, whereby said rocker-frame is moved into alternate active and inactive relations with said respective cam-sets.

15. In mechanism of the character described, the combination of a plurality of cam-sets, a rotating part, each of said cam-sets provided with interrupted driven means for said rotating part, a rocker-frame having a positioning part and an operated part thereon for each of said cam-sets, said positioning parts and said operated parts arranged for alternate coaction with said respective cam-sets, each of said cam-sets being provided with a coacting positioning part and with a cam for moving said operated part of said rocker-frame, whereby said rocker-frame is moved into alternate active and inactive relations with said respective cam-sets, and an actuated part for said cam-sets respectively, said cam-sets being provided with cams for moving said actuated part.

16. In mechanism of the character described, the combination of a plurality of cam-sets, a rotating part, each of said cam-sets provided with interrupted driven means for said rotating part, a rocker-frame having a positioning part and an operated part thereon for each of said cam-sets, said positioning parts and said operated parts arranged for alternate coaction with said respective cam-sets, each of said cam-sets being provided with a coacting positioning part and with a cam for moving said operated part of said rocker-frame, whereby said rocker-frame is moved into alternate active and inactive relation with cam-sets, a movable part, and coacting means between said movable part and cam-sets for selectively arresting operation of said respective cam-sets.

17. In mechanism of the character described, the combination of a plurality of series of cam-sets, each of said series of cam-sets arranged end-to-end and the cam-sets of said respective series arranged opposite each other, a slide, said slide and respective cam-sets having coöperating slots and pins therebetween, and means for maintaining selective ones of the latter in inactive relation and permitting active relation between selective ones of the same.

18. In mechanism of the character described, the combination of a driving part, a plurality of series of cam-sets in normally inactive relation with said driving part, the cam-sets of each series arranged end-to-end and the cam-sets of said respective series arranged opposite each other, said cam-sets provided with pins, a slide provided with coacting slots therefor, and means for arresting movement of selective ones of said pins, the release of said last-named means permitting movement of said pins with relation to said slots and thereby permitting rocking of the cam-set of said pin into active relation with said driving part.

19. In mechanism of the character described, the combination of a controlled device, a driving part, a plurality of series of cam-sets in normally inactive relation to said driving part, the cam-sets of each series arranged end-to-end and the cam-sets of said respective series arranged opposite each other, said cam-sets provided with pins, a slide provided with coacting slots therefor, means for arresting movement of selective ones of said pins, the release of said last-named means permitting movement of said pins with relation to said slots and thereby permitting rocking of the cam-set of said pin into active relation with said driving part, and a governor having operative connection with said slide, the speed of said governor being controlled by said controlled device.

20. In mechanism of the character described, the combination of a plurality of series of cam-sets, the cam-sets of each series arranged end-to-end and the cam-sets of said respective series arranged opposite to each other, a continuously rotating operating part, each of said cam-sets provided with a contact-face therefor for being operated thereby, each of said contact-faces provided with an interruption normally opposite said operating part, and a rocker-frame having thereon engaging parts and contacted parts for said respective cam-sets, the engaging parts and contacted parts of opposed cam-sets acting in alternation, and each of said cam-sets being provided with a cam for engaging the said contacted part coacting with said cam-set.

21. In mechanism of the character described, the combination of a plurality of series of cam-sets, the cam-sets of each series arranged end-to-end and the cam-sets of said respective series arranged opposite to each other, a continuously rotating operating part, each of said cam-sets provided with a contact-face therefor for being operated thereby, each of said contact-faces provided with an interruption normally opposite said operating part, a rocker-frame having thereon engaging parts and contacted parts for said respective cam-sets, the engaging parts and contacted parts of opposed cam-sets acting in alternation, each of said cam-sets being provided with a cam for engaging the contacted part coacting with said cam-set, and an actuated device for each of said series of cam-sets, each cam-set being provided with a cam for actuating the actuated device of its series.

22. In mechanism of the character described, the combination of a plurality of series of cam-sets, the cam-sets of each series arranged end-to-end and the cam-sets of said respective series arranged opposite each other, a continuously rotating operating part, each of said cam-sets provided with a contact-face therefor for being operated thereby, each of said contact-faces provided with an interruption normally opposite said operating part, a rocker-frame having thereon engaging parts and contacted parts for said respective cam-sets, the engaging parts and contacted parts of opposed cam-sets acting in alternation, each of said cam-sets being provided with a cam for engaging the contacted part coacting with said cam-set, and spring pressure means for said rocker-frame yieldingly urging said respective contacted parts toward the coacting cam-sets therefor.

23. In mechanism of the character described, the combination of a plurality of series of cam-sets, the cam-sets of each series arranged end-to-end and the cam-sets of said respective series arranged opposite to each other, a continuously rotating operating part, each of said cam-sets provided with a contact-face therefor for being operated thereby, each of said contact-faces provided with an interruption normally opposite said operating part, a rocker-frame having thereon engaging parts and contacted parts for said respective cam-sets, the engaging parts and contacted parts of opposed cam-sets acting in alternation, each of said cam-sets being provided with a cam for engaging the contacted face coacting with said cam-set, and a slide, said slide and cam-sets being provided with coacting pins and slots, and said engaging parts maintaining selective ones of said last-named parts in inactive relation and permitting active relation between other selective ones of said last-named coacting parts.

24. In mechanism of the character described, the combination of a plurality of series of cam-sets, the cam-sets of each series arranged end-to-end and the cam-sets of said respective series arranged opposite to each other, a continuously rotating operating part, each of said cam-sets provided with a contact-face therefor for being operated thereby, each of said contact-faces provided with an interruption normally opposite said operating part, a rocker-frame having thereon engaging parts and contacted parts for said respective cam-sets, the engaging parts and contacted parts of opposed cam-sets, acting in alternation, each of said cam-sets being provided with a cam for engaging the contacted part coacting with said cam-set, and a slide, said slide and cam-sets being provided with coacting pins and slots, said engaging parts maintaining selective ones of said coacting parts in inactive relation and permitting active relation between other selective ones of said coacting parts, said slide movable in opposite directions, one of the slots for each series of cams having side walls, and the said side walls of said respective slots slanting in opposite directions.

25. In mechanism of the character described, the combination of a plurality of series of cam-sets, the cam-sets of each series arranged end-to-end and the cam-sets of respective series arranged opposed to each other, each of said cam-sets being provided with a controlling pin, and a slide having a slideway thereon for the pins of each series of cam-sets, said slideways provided with slots for permitting passage therethrough of said pins.

26. In mechanism of the character described, the combination of a plurality of series of cam-sets, the cam-sets of each series arranged end-to-end and the cam-sets of respective series arranged opposed to each other, each of said cam-sets being provided with a controlling pin, a slide having a slideway thereon for the pins of each series of cam-sets, said slideways provided with slots for permitting passage therethrough of said pins, and means for positioning selective ones of said pins in inactive relation to said slideways.

27. In mechanism of the character described, the combination of a plurality of series of cam-sets, the cam-sets of each series arranged end-to-end and the cam-sets of respective series arranged opposed to each other, each of said cam-sets being provided with a controlling pin, a slide having a slideway thereon for the pins of each series of cam-sets, said slideways provided with slots for permitting passage therethrough of said pins, a slot of each slideway having slanting side walls, the slanting of said side walls in said respective slideways being in opposite directions, the opposed termini of the slanting walls of each of said last-named slots being located in transverse planes which are closer together than the transverse diameter of the pin coacting therewith.

28. In mechanism of the character described, the combination of a plurality of series of cam-sets, the cam-sets of each series arranged end-to-end and the cam-sets of respective series arranged opposed to each other, a rotating driving part, said cam-sets each provided with coacting driving means therefor provided with interruptions normally opposite said driving part, a movable part, said movable part and cam-sets having coacting positioning means for said cam-sets whereby the interruptions of any given cam-set may be moved for driving said cam-set, actuated mechanism, each of said cam-sets provided with a cam for actuating the same, and connecting means extending from said actuated mechanism for connection with a controlled device.

29. In mechanism of the character described, the combination of a governor, a controlling device for effecting speed change, and a speed-limit device, both said devices having operative connection with said governor and having operatively spaced connection with each other.

30. In mechanism of the character described, the combination of a governor, a speed-controlling device and a speed-limit device, each of said devices having operative connection with said governor and having operatively spaced connection with each other, and means for rendering said operative connection between said governor and speed-limit device inactive.

31. In mechanism of the character described, the combination of a governor, a speed-changing controlling device and a speed-limit device, both said devices having operative connection with said governor and having operatively spaced connection with each other, and means for adjusting the limiting effect of said speed-limit device.

32. In mechanism of the character described, the combination of a governor, a speed-controlling device embracing a part moved by said governor and a series of parts having sequential operative relation with said moved part in increasing and in decreasing speed relation, and a speed-limit device having connection with said governor and with said part moved by said governor and provided with adjusting means for adjusting the limit of speed in any of the speeds effected by said speed controlling device.

In testimony whereof, we have signed our names hereto in the presence of two subscribing witnesses.

ARTHUR E. REUSS.
OSCAR SCHNITZLER.

Witnesses:
EDWARD SOUTHWORTH,
THERESA SILBER.